(No Model.) 2 Sheets—Sheet 1.
C. COMSTOCK.
SHORT TURNING VEHICLE.
No. 457,508. Patented Aug. 11, 1891.
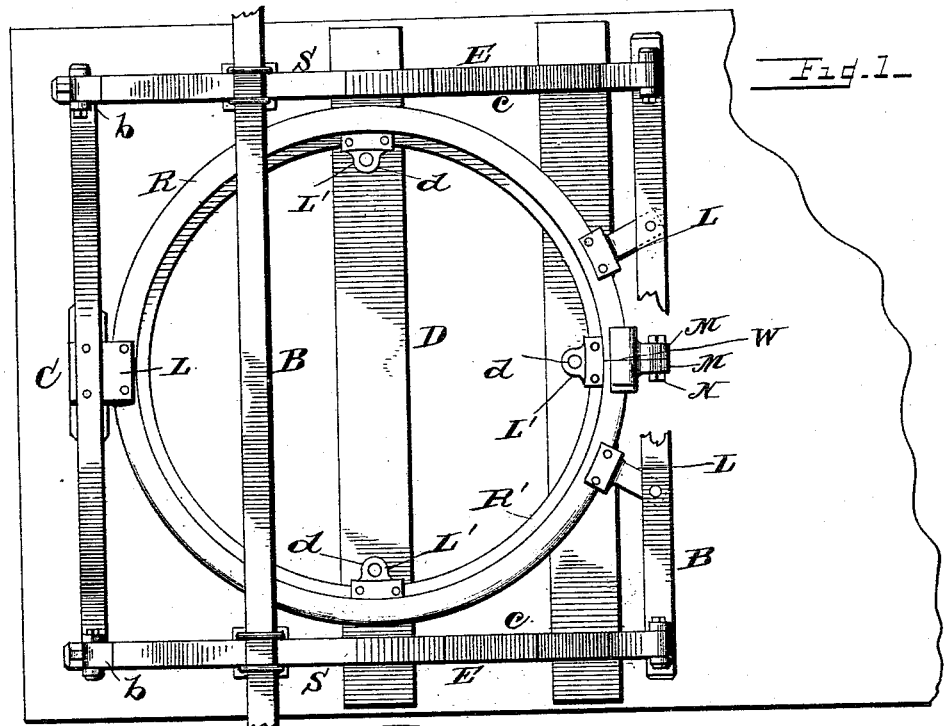
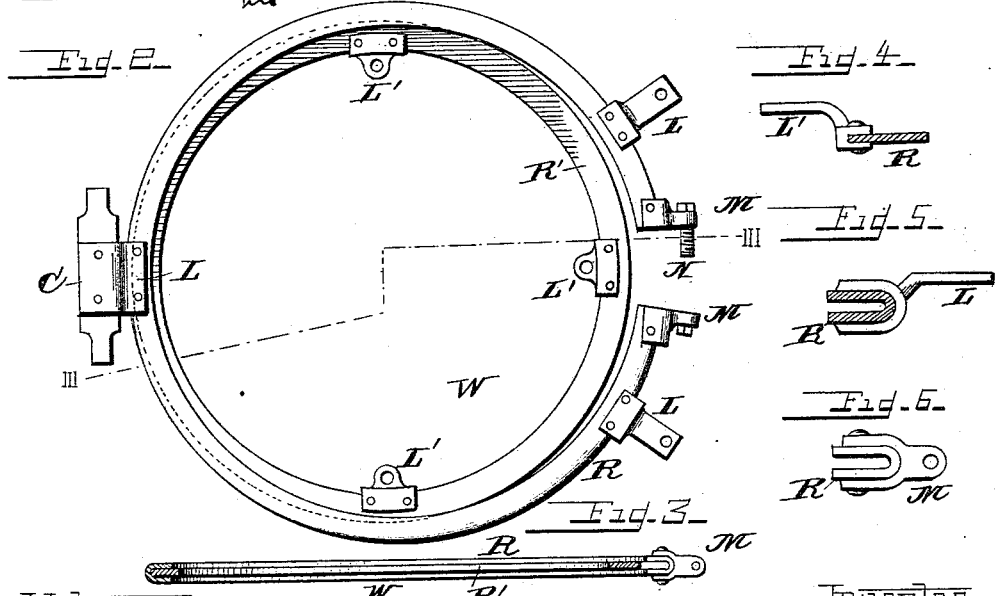
WITNESSES
J. D. Kingsbury
Geo. A. Prevost
INVENTOR
Charles Comstock
By Wm. M. Eccles
atty

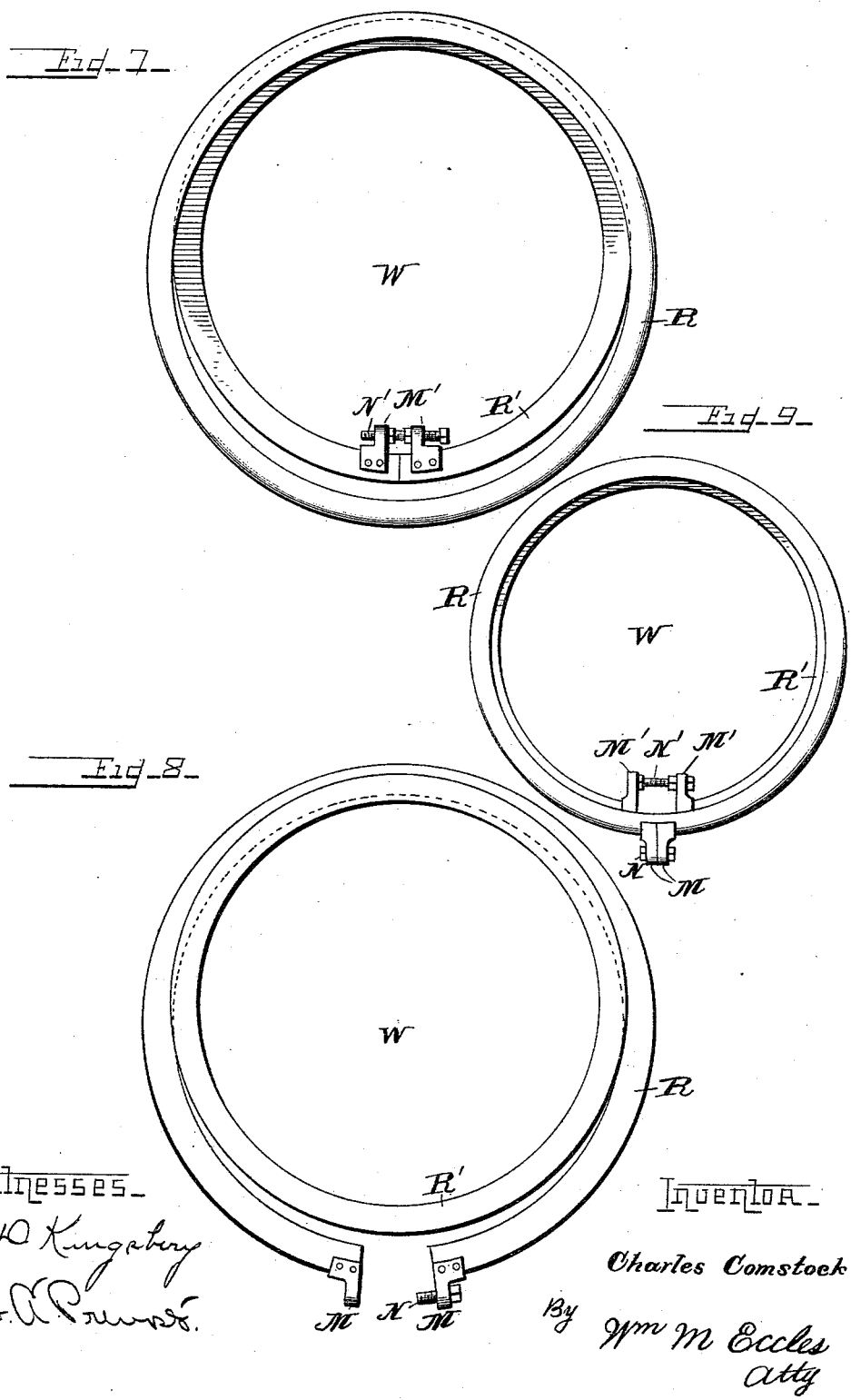

UNITED STATES PATENT OFFICE.

CHARLES COMSTOCK, OF INDIANAPOLIS, INDIANA.

SHORT-TURNING VEHICLE.

SPECIFICATION forming part of Letters Patent No. 457,508, dated August 11, 1891.

Application filed March 28, 1890. Serial No. 345,799. (No model.)

*To all whom it may concern:*

Be it known that I, CHARLES COMSTOCK, a citizen of the United States, residing in the city of Indianapolis, in the county of Marion, in the State of Indiana, have invented a new and useful Improvement in Short-Turning Vehicles, of which the following is a specification.

My invention relates to short-turning vehicles; and it consists chiefly in combining with a spring-platform on a front axle a king-boltless fifth-wheel.

It also consists in the arrangement and combination of parts hereinafter described and claimed.

The objects of my invention are to secure cheapness of construction and durability of parts, as well as safety in use and turning in a short space. I attain these objects by the mechanism illustrated in the accompanying drawings, in which—

Figure I is a bottom plan of my invention, showing the bottom of the body and the front axle, spring-platform, and the coupling device or boltless fifth-wheel movably connecting the spring-platform to the body. Fig. II is a detached plan of my coupling device or king-boltless fifth-wheel, showing the manner of inserting the inside rim. Fig. III is a transverse section of same on line III III in Fig. II. Fig. IV is a side elevation of one of the lugs attached to the inside rim of boltless fifth-wheel and shows part of rim in cross-section. Fig. V is an elevation of one of the lugs attached to the outer rim or housing of the boltless fifth-wheel and a transverse section of the housing or outer rim. Fig. VI is a detached view of the lug which holds the ends of the outer rim together. Fig. VII is a modified form of my fifth-wheel, showing the inner rim with a joint and the outer one jointless and U-shaped. Fig. VIII is another modified form of my fifth-wheel, showing the inner rim jointless and U-shaped and the outer one with a joint. Fig. IX is another modified form of my fifth-wheel with both outer and inner rim jointed.

A is a front transverse spring, shackled at its respective ends to short inelastic stubs $b$ $b$ of lateral springs S S and clipped or otherwise secured to the front part of the outside rim of the boltless fifth-wheel W, preferably with the intervention of a wooden head-block C between the boltless fifth-wheel and the spring A. The springs S S are secured to the front axle forward of their centers and have the parts $b$ $b$ in front of the axle preferably inelastic. They can be elastic, however, as I do not intend to limit myself to inelastic stubs $b$ $b$. The rear portions of the springs S S are elastic, and are represented by letters $c$ $c$. These elastic ends are connected to a cross-bar B by pivotal connections. It will be remembered that the axle B' is connected to the springs toward the front, so that the center of motion of the spring-platform as it moves in turning under the body will fall in rear of the axle. All this is old, as shown in my former applications in this same line of art.

R is an outer rim or double-track plate, made U shape in cross-section and preferably of one piece of metal rolled into that shape. At the same time it is bent into a circle, and preferably by the same set of rolls. Its diameter is approximately the width of the body of the vehicle, so that the parts will have as little leverage strain as possible. It is provided with open-lipped lugs L L L, which embrace the outside of the rim R and to which the lips are secured with rivets or otherwise. These lugs are provided with bolt-holes at their outer ends, by means of which they are secured to the front head-block C or spring A in front and to the bar B, respectively, as shown, by bolts. Thus the outer rim R is made fast to the spring-platform. This outer rim is provided with binding-lugs M M, which have lips adapted to embrace the outside of the rim R near its respective ends, and which lips are riveted or otherwise secured to the rim R near each end. They are each provided with transverse holes, through which a bolt N is passed and screwed up when the ends of the rim R are brought together, and thus securely holds the rim around the inner rim R'. This rim R' is made of an ordinary piece of steel bar, which is bent into a circle having its periphery coinciding with the inside of the outer rim R and adapted to move within the same when the outside rim is closed at its ends. This inner rim is provided with inwardly-projecting lugs L' L' L', which have lips embracing the inner portions of the rim R', and which lips are secured thereto by rivets or bolts. These lugs L' project inward and are adapted to be bolted or otherwise secured to the frame-work of the bottom of the body D, as at *d d d*. The lugs L' and L may be made of any suitable material.

It is obvious that I can construct other forms of a boltless fifth-wheel without departing from the spirit of my invention. It is also obvious that I do not depart from the spirit of my invention if I make the inside rim U-shaped and the outside one substantially to coincide in its general contour to the inside of the U of the inner rim, as shown in Fig. VIII, where R' is U-shaped and R is flat; nor do I limit myself to any one of the rims being jointed, as either or both may be jointed and the same results obtained—namely, readily encompassing the one within the other.

N', Fig. VII, is a long bolt having nuts inside of the lugs M' M', which lugs are fastened to the inner rim, whereby it can be readily spread by securing the nuts in opposite directions. N' and M' M' serve the same purpose in Fig. IX. I am thus enabled to dispense with both reach and king-bolt and have a vehicle which will not rattle or make a noise at the fifth-wheel on account of dispensing with joints therein.

Now what I claim as new, and for which I ask Letters Patent of the United States to be granted to me, is—

1. In a short-turning vehicle, a king-boltless fifth-wheel, composed of an outer and inner ring, each made of a single piece of metal, the outer ring being made ⊃-shaped in cross-section, with its lips extending inwardly and cut through at one point of its periphery, whereby it can be sprung apart and the inner ring admitted within the inwardly-projecting lips, as shown.

2. In a short-turning vehicle, a king-boltless fifth-wheel, composed of an outer and inner ring, each made of a single piece of metal, the outer ring being made ⊃-shaped in cross-section, with its lips extending inwardly and cut through at one point of its circumference, whereby it can be sprung apart and the inner ring admitted within the inwardly-projecting lips of the outer ring, in combination with a front transverse spring, upon the crown of which said fifth-wheel is mounted, the ends of said spring being attached to the ends of two lateral springs supported on the front axle, substantially as described, and for the purposes set forth.

CHAS. COMSTOCK.

Witnesses:
FRANK W. WARNER,
ERNEST C. ROPKEY.